July 26, 1932. J. A. KLOD 1,869,219

CUTTING MEMBER AND HOLDER THEREFOR

Filed May 27, 1929

John A. Klod INVENTOR

BY Victor J. Evans

HIS ATTORNEY

Patented July 26, 1932

1,869,219

UNITED STATES PATENT OFFICE

JOHN A. KLOD, OF CHICAGO, ILLINOIS

CUTTING MEMBER AND HOLDER THEREFOR

Application filed May 27, 1929. Serial No. 366,463.

This invention relates to certain novel improvements in cutting members and holders therefor which is especially adapted for use on so called meat grinders and the like and has for its principal object the provision of an improved construction of this character which will be efficient in use and economical in manufacture.

It is among the objects of my invention to provide a cutting member for a meat grinder or the like which will embody a holding member in which the cutting blades may be removably mounted in order that the blades may be replaced as required.

Another object of the invention is to provide a construction of the above described character in which blades will be arranged which will be easily removable and which will be constructed so that they may be sharpened as required.

A still further object of the invention is to provide a construction of the above described character in which the blades will be formed in a manner that will greatly facilitate the locking thereof in the holding device.

A still further object of the invention is to provide a blade construction of the above described character which will embody portions that will permit the interlocking of the blades.

Other objects will appear hereinafter.

The invention consists in the novel combination and arrangement of parts to be hereinafter described and claimed.

The invention will be best understood by reference to the accompanying drawing, showing the preferred form of construction and in which.

Figure 1:
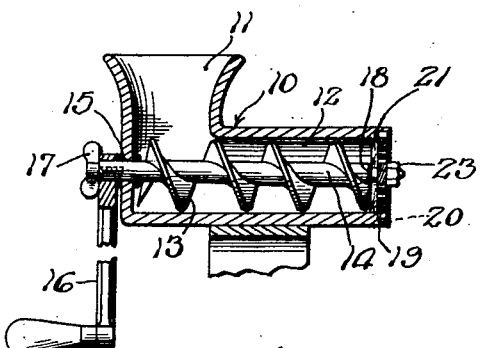
Fig. 1 is a longitudinal sectional view depicting a typical meat grinder with which a preferred form of construction for my invention has been associated.

In the accompanying drawing wherein I have illustrated a preferred form of construction for my invention, 10 generically indicates a typical meat grinder which includes a mouth portion 11 through which material to be ground or cut in the device may be introduced into the relatively elongated neck portion 12. A feed screw 13 is arranged on the shaft 14 and said shaft has one end portion journaled in the bearing 15 at one end of the relatively elongated neck 12. A handle 16 is secured to the end of the shaft 14 which extends beyond the bearing 15 by the wing nut 17. The opposite end of the shaft 14 is reduced as indicated at 18 and this reduced portion is extended through the perforated plate 19 which is held against rotative movement by the lug 20 that is fitted in a recess in the adjacent end of the neck portion 12. While the foregoing description is depicted it is to be understood that this is not to be taken as a limitation of my invention since any desired arrangement may be substituted in place of that shown without departing from the purview of my invention.

As is well understood in the art the material introduced into the mouth 11 is forced through the neck portion 12 by the feed screw 13 which forces the material past a cutting implement 21 through the perforations in the plate 19. As the material passes the cutting implement 21 and travels through the perforations 19 the cutting implement acts on the material with a shearing action and in this manner the material is chopped or ground.

The cutting implement I employ in my improved device is generically indicated by 100

Figure 2:
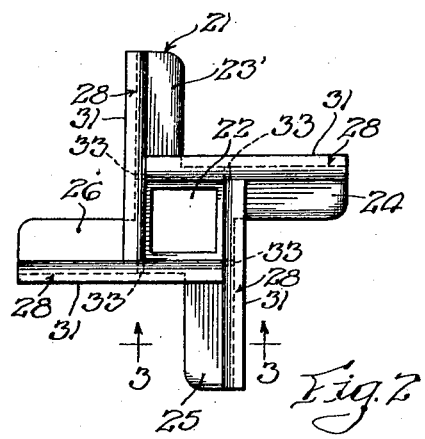
Fig. 2 is an elevational view depicting my improved blade holder having the blades mounted therein.

21. By referring to Fig. 2 it may be seen that a substantially square opening 22 is formed in the cutting implement 21 which is fitted over a correspondingly shaped portion on the shaft 14 and which is retained in position by a nut 23. While I have depicted this arrangement for securing the implement 21 in position it is to be understood that analogous arrangements might be employed without departing from the purview of my invention.

In the present instance the cutting implement 21 comprises four arms 23, 24, 25, and 26. The arms 23 and 25 extend at right angles with respect to the arms 24 and 26. Preferably the arms 23 and 25 are arranged so that one edge of the arm 23 will be aligned with the opposite edge of the arm 25. The arms 24 and 26 are similarly disposed so that one edge of the arm 24 will be aligned with the opposite edge of the arm 26.

Figure 3:
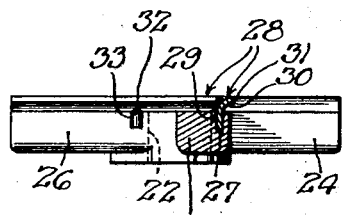
Fig. 3 is a sectional view taken substantially on the line 3—3 on Fig. 2.

By referring to Fig. 3 it may be seen that a groove 27 is formed in the arm 25 in the upper surface thereof adjacent the edge of said arm 25 that is not aligned with an edge of the arm 23. Grooves similar to the groove 27 are similarly disposed in each of the arms 23, 24, and 26 and these grooves serve to retain the cutting blades in position. The foregoing arrangement is employed in both embodiments of my invention illustrated and this construction provides the holder or holding member hereinbefore set forth.

Figure 4:
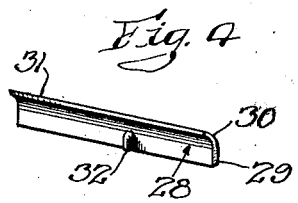
Fig. 4 is a perspective detail view of the blade mounted in the device depicted in Figs. 2 and 3.

In Fig. 4 I have depicted one form of blade construction for my device and this blade is indicated by 28. The blade 28 includes a vertically extending portion 29 which terminates adjacent its upper end in an outwardly bent portion 30 and along the upwardly disposed edge of the portion 30 the cutting edge 31 is defined. In spaced relation with one end of the blade 28 a portion 32 is struck outwardly in the direction of the bend 30 and this portion is arranged so as to be disposed closer to one end of the blade 28 than the other. Formed in each of the arms 23, 24, 25, and 26 at a point spaced from the outwardly disposed end thereof substantially equal to the distance between the out struck portion 32 and the end of the blade disposed most remote from this portion and in the portion of the arms intermediate the groove 27 and the juxtaposed edge I form notches 33 which extend downwardly from the upper edges. These notches 33 are utilized in the following manner. When the blades 28 are arranged with the portions 29 thereof in the grooves 27 the out struck portions 32 fit into the recesses 33. This fitting prevents movement longitudinally of the blade in the slot 27. The fit of the blades in the slot is preferably such that sufficient tension will be exerted on the blades to prevent their moving outwardly from the slots.

When the cutting implement 21 having the blades 28 thereon is arranged in abutment with the plate 19 the blades 28 are disposed so that the cutting edges 31 thereon will travel over the plate 19 so as to produce the shearing action set forth and in this manner the material passed through the perforations in the plate 19 will be effectively ground.

It is apparent from the foregoing description that I have provided a construction which will be expeditiously mounted on the shaft extending through a meat grinder or the like. It is manifest that the blades in the cutting implement are retained against displacement when the device is so arranged and it is also manifest that these blades may be expeditiously removed for replacement, sharpening and the like. It is also manifest that the notch 33 in one arm is arranged in alignment with the groove 27 in the arm extending toward the major extent of the first named arm and this is the preferable disposition of these notches although it is manifest that these notches might be arranged in other positions in the embodiment of the invention without departing from the spirit and scope of the invention.

Figure 5:
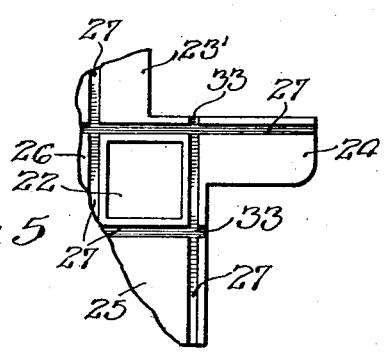
Fig. 5 is a fragmental view looking in the same direction as Fig. 2 showing my improved holder and the blade receiving grooves therein.
Figure 6:
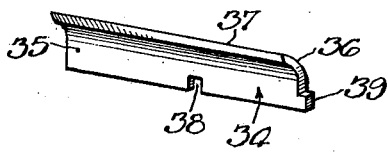
Fig. 6 is a perspective detail view of the blade employed in the embodiment of the invention illustrated in Fig. 5.
Figure 7:
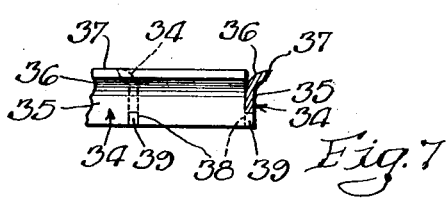
Fig. 7 is a fragmental view depicting the interlocking of the blades to be employed in the holder as depicted in Fig. 5.

In the embodiment of the invention illustrated in detail in Figs. 5, 6, and 7 the holder hereinbefore set forth is constructed in identical manner. However, in this instance it is necessary that the notches 33 be aligned with the grooves in the manner hereinbefore set forth for a purpose that will be made apparent presently. In this embodiment of the invention blades generically indicated by 34 are employed which embody a portion 35 similar to the portion 29 and a portion 36 similar to the portion 30 and a cutting edge 37 similar to the cutting edge 31. At substantially the same location in the blade 34 as the location of the out struck portion 32 in the blade 28 in the lower edge thereof I form a recess 38. On the inwardly disposed end of the blade 34 I form an outstanding lug 39. When one of the blades 34 is disposed in the groove 27 of the arm 25 the notch 38 therein is aligned with the notch 33 in said arm 25. The lug 39 thereon is disposed in the notch 33 of the arm 24 and this lug 39 also extends through the groove 27 in the arm 24 and the adjacent end of the blade 34 terminates at the edge of the groove 27 in the arm 24. Therefore, when a blade 34 is arranged in the groove 27 of the arm 24 the notch 38 in this last named blade 34 will fit over the lug 39 in the groove 27 of the arm 24 which is the lug 39 on the blade 34 disposed in the groove 27 of the arm 25. It is not necessary that the lug 39 extend into the notch 33 since this lug is merely intended to fit into the notch 38 of the blade 34 which extends at right angles to the blade carrying the notch. In a manner substantially similar to that set forth the lug 39 on the blade 34 disposed in the groove 27 of the arm 24 is fitted into the notch 38 of the blade 34 disposed in the groove 27 of the arm 23. In a similar manner this last named blade is interconnected with the blade disposed in the groove 27 of the arm 26 and this last named blade is arranged so that the lug 39 thereon extends into the notch 38 on the blade 24 disposed in the groove 27 of the arm 25. It is manifest that the foregoing arrangement interlocks the various blades in the various grooves in which they are disposed and by reason of the interconnection between the blades by reason of the lugs 39 and the notches 38 it is manifest that the various blades will be securely retained in position.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claim.

Having thus described my invention what I claim as new and desire to protect by Letters Patent is:

In a meat grinder, cutting blades each provided with a notch and a lug at one end thereof whereby when the blades are disposed at right-angles with respect to each other, the lug of one blade will be disposed in the notch of the other blade.

In testimony whereof I affix my signature.

JOHN A. KLOD.